United States Patent Office 3,124,618
Patented Mar. 10, 1964

3,124,618
SALTS OF BIS-SULFINYL CARBANIONS, PROCESS FOR THEIR PREPARATION, AND REACTIONS OF SAID SALTS WITH ORGANIC HALIDES
Jim Smither Berry, Springfield Township, Hamilton County, Ohio, assignor to The Procter & Gamble Company, Cincinnati, Ohio, a corporation of Ohio
No Drawing. Filed Dec. 21, 1962, Ser. No. 246,312
6 Claims. (Cl. 260—607)

This invention relates to the preparation of compounds useful as intermediates in the preparation of new and useful compounds. Specifically, this invention relates to the preparation of carbanions containing two sulfoxide groups adjacent to the carbon atom carrying the negative charge, to the carbanions, to the salts of said carbanions, and to certain reactions of said carbanions.

The sulfoxide group is a very useful hydrophilic group for compounds having surface active properties, and an effective process for introducing two sulfoxide groups into compounds having a long-chain hydrophobic group is very desirable. Previously, sulfoxides have been prepared by oxidation of the corresponding sulfides. However, this oxidation method almost inevitably produces a mixture containing some unreacted sulfides and/or some sulfone by-products which are generally undesirable. Since it is difficult to separate the long alkyl chain sulfides and sulfones from the desired sulfoxides, and it is impossible to separate them by distillation, this route to long chain sulfoxide is somewhat inefficient.

The oxidation of a sulfiide to a sulfoxide is also generally not appropriate when one desires to prepare compounds containing both a sulfoxide group and other functional groups such as hydroxy, alkoxy, keto, etc. groups. When these other functional groups are present in the sulfide molecule which is to be oxidized to a sulfoxide, oxidation of these groups and/or cleavage of the molecule can occur.

Furthermore, it is generally impossible to selectively oxidize two of three or more thioether groups present together in a compound. Thus preparation of specific compounds containing both sulfoxide groups and a thioether group is very difficult by ordinary methods.

Therefore, it can be appreciated that an effective method for introducing sulfoxide groups at pre-determined sites within a molecule is desirable. It can be equally appreciated that a method which permits the formation of certain compounds containing easily oxidized or easily cleaved groups in addition to the sulfoxide groups is especially desirable. Furthermore, such a method is more desirable when it does not require the use of high temperatures, corrosive oxidizing agents, and specialized equipment.

Accordingly, it is an object of this invention to provide intermediates useful in the synthesis of compounds containing two sulfoxide groups.

It is a more specific object of this invention to provide carbanions in which two sulfoxide groups are adjacent to the carbon atom bearing the negative charge (hereinafter referred to as bis-sulfinyl carbanions).

It is a still further object to provide processes for preparing such bis-sulfinyl carbanions.

It is a still more specific object of this invention to provide salts of said carbanions.

It is a yet further object to provides processes for preparing detergent surfactants from such bis-sulfinyl carbanions.

The principal object of this invention, i.e., the formation of the bis-sulfinyl carbanions, can be achieved by reacting a bis-sulfoxide having the formula

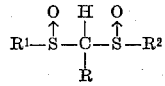

wherein R is selected from the group consisting of hydrogen and alkyl groups containing from one to about eighteen carbon atoms and $R^1$ and $R^2$ are each alkyl groups containing from one to about three carbon atoms, with a base selected from the group consisting of amides, hydrides, and alkoxides of alkali metals, e.g., sodium potassium, and lithium. R, $R^1$, and $R^2$, can contain substituent groups which are non-reactive with the base. R, $R^1$ and $R^2$ have the above respective definitions throughout the specification and claims.

The symbol used for the sulfoxide group

or simply —SO—, is only a convenient representation of the structure for purposes of the description of the invention and is not necessarily indicative of the actual structure which is believed to involve a semi-polar bond.

The bis-sulfoxide compounds which react with the base to form the bis-sulfinyl carbanions of this invention are characterized by having two sulfoxide groups attached to the same carbon atom, said carbon atom being attached to at least one hydrogen atom. Surprisingly, this hydrogen atom is sufficiently activated by the presence of the two adjacent sulfoxide groups so that said hydrogen atom is preferentially removed by relatively weak bases such as the alkali metal alkoxides as well as the strong bases such as alkali metal amides and hydrides. The carbanion thus formed has the formula

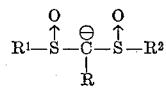

It will be understood that the carbanion is always associated with a cation. Thus, it exists in the form of its alkali metal salt

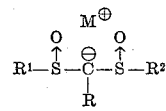

wherein R, $R^1$, and $R^2$, are as hereinbefore described and $M^\oplus$ represents an alkali metal, e.g., sodium, potassium or lithium.

The groups R, $R^1$ and $R^2$, can contain substituent groups which are non-reactive with the base used to form the carbanion. As examples of such non-reactive groups, substituent groups containing up to two ether and/or thioether linkages are suitable. For example, 1.1-bis(methylsulfinyl) 3-dodecoxy propane is a suitable starting compound containing an R group with an ether linkage. The corresponding thioether compound is also suitable. The preferred starting material in the process of this invention is bis(methylsulfinyl) methane forming the preferred carbanion

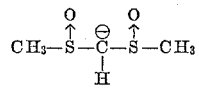

Examples of the bases used in the process include sodium, potassium and lithium amides, hydrides, and alkoxides where the carbon chain of said alkoxide contains from one to about six carbon atoms. These bases are usually present in a stoichiometric amount to react with the bis-sulfoxide starting material or else there is usually an excess of the bis-sulfoxide starting material.

The reaction of the bis-sulfoxide starting material with the base proceeds as follows:

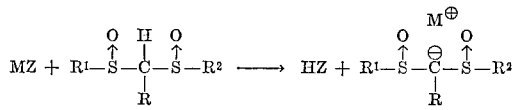

wherein M is an alkali metal and Z is selected from the group consisting of amide ($-NH_2$), hydride ($H-$), and alkoxy groups containing from one to about six carbon atoms. Thus HZ represents ammonia, hydrogen, and alcohols, respectively.

The reaction to form the bis-sulfinyl carbanion should be carried out in the absence of compounds which are more reactive with the essential bases than the hydrogen attached to a saturated carbon atom which is intermediate the two sulfoxide groups. For instance, such compounds as water and acids are more reactive with the base than the bis-sulfoxide starting material. Consequently, their presence interferes with the reaction by preferentially reacting with the base and in sufficient amounts to react with all of the base would prevent the desired formation of a bis-sulfinyl carbanion.

Dimethyl sulfoxide is the preferred solvent to dissolve the bis-sulfoxide compound starting material for this reaction. However, other non-reactive solvents or diluents can be used. These solvents should not contain any of groups which will react with the base used to form the carbanion, either as a part of the structure of the solvent or as part of impurities present in the solvent, if maximum yields are desired. The use as solvents of compounds which will react with the carbanion is also generally undesirable. It is recognized, however, that such compounds can be present as a solvent or as a component of a solvent mixture to yield an in situ formation and reaction of the bis-sulfinyl carbanion.

Suitable non-reactive solvents or diluents are to be found in such classes of compounds as the aliphatic or aromatic hydrocarbons, aliphatic or aromatic ethers, cyclic ethers, and amines. Examples of suitable non-reactive hydrocarbon solvents include hexane, petroleum ether, "Stoddard" solvent, benzene, toluene, and mixed xylenes. Among the ether compounds which have been found suitable as solvents are diethyl ether, dibutyl ether, diphenyl ether, tetrahydrofuran, 1,2-dimethoxyethane, and diethylene glycol dimethyl ether. Amine compounds which can serve as solvents for the formation and subsequent reaction of the bis-sulfinyl carbanions include butylamine, N-methyl butylamine, anhydrous ethylene diamine, pyridine, and morpholine. Anhydrous liquid ammonia can also be used as a solvent and is especially useful when the base is an alkali metal amide. Still another compound which is suitable is N,N-dimethyl formamide. Other similar non-reactive solvents or diluents can be used with substantially equivalent results.

The solvent used can affect the rate of formation of the bis-sulfinyl carbanion depending on such factors as its ability to dissolve one or both reactants. The rate and course of subsequent reactions of the carbanion can also be affected by the choice of solvent. The use of mixtures of two or more non-reactive compounds as the reaction medium, is, of course, suitable and in some cases is preferable to the use of a single species.

The temperature of the reaction mixture is preferably kept at about 50–75° C., but lower and higher temperatures from about 25°–100° C. can be used. Preferably the temperature is above the melting point of the solvent or the reactants. Lower temperatures increase the required reaction time and if the temperature is too high, decomposition will result.

The carbanions of this invention react readily with an organic halide selected from the group consisting of bromides, iodides, and chlorides. These halides have the formula $$R^3-CH_2-X$$

wherein X is selected from the group consisting of chlorine, bromine, and iodine, and $R^3$ is selected from the group consisting of hydrogen and alkyl and aryl-substituted alkyl hydrocarbon chains containing from one to about thirty carbon atoms wherein the carbon of $R^3$ joining $R^3$ to the $-CH_2X$ group is attached to the rest of the $R^3$ group by single covalent bonds. The reaction between the halide and the bis-sulfinyl carbanion (e.g., sodium salt) is as follows:

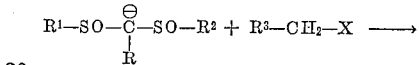
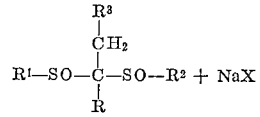

Depending on the halide used, the rate of the reaction will vary. The reaction temperature should be between about 25°–100° C., preferably 50°–75° C. The carbanion will decompose at higher temperatures, and the reaction will proceed too slowly at lower temperatures.

Examples of halide reactants for the bis-sulfinyl carbanion include dodecyl bromide, dodecyl chloride, neopentyl chloride, octadecyl bromide, hexadecyl bromide, hexadecyl chloride, hexyl bromide, 3-(chloromethyl) heptane, amyl chloride, iso-amyl chloride, methyl chloride, methyl iodide, and tetradecyl bromide. Alkyl halides, as hereinbefore described, containing from about 8 to about 16 carbon atoms are preferred reactants with alkali metal salts of bis-(methylsulfinyl) carbanions to form detergent surfactants. Any branched, ring or straight chain hydrocarbon, whether saturated or unsaturated, containing a halogen atom attached to a primary, saturated alkyl carbon and fitting the description hereinbefore given will react in the above manner. Suitable substituent groups on these hydrocarbons include ether and thioether linkages. The products of these reactions either have useful and desirable surface active (including detergent) properties or are useful in the preparation of surface active compounds.

The products of this reaction are unique in that they are generally obtained in a much purer state than is possible by any previously known method of preparation. As a consequence, they are less likely to have an odor or to contain ineffective or undesirable by-products.

The reaction should be carried out in the absence of any material which is preferentially more reactive with bases than the hydrogen atom attached to the carbon atom intermediate the two sulfoxide groups.

The following example illustrates, but does not limit, the practice of this invention.

*Example*

4.0 g. (0.036 mol.) potassium t-butoxide was added to 5.0 g. (0.036 mol) of bis(methylsulfinyl) methane dissolved in 50 ml. of dry dimethyl sulfoxide. The reaction was slightly exothermic. After stirring the mixture for one hour at room temperature, the solution was heated to 60° C. At this time the mixture continined a solution of the potassium salt of bis(methylsulfinyl) carbanion in dimethyl sulfoxide. Dodecyl bromide (8.8 g., 0.035 mol) was added at room temperature to the stirred reaction mixture. After the dodecyl bromide was added, the reaction mixture was heated to about 45° C. and stirred for five hours. The mixture was allowed to stand overnight and the dimethyl sulfoxide solvent was removed in vacuo. Acetone was added to the mixture and the inorganic salts were removed by filtration. The filtrate was chilled in Dry Ice-acetone and the resulting precipitate separated by filtration. The precipitate was then redissolved in acetone, decolorized with activated charcoal, precipitated by chilling, and filtered. The product was 1,1-bis(methylsulfinyl) tridecane (M.P. 72–91° C.) in 37% yield. The infrared spectrum was consistent with the structure. Further crystallization gave a higher concentration of higher melting diastereo isomers which raised the melting point to 86–92° C. without altering the spectra.

When sodium amide, sodium hydride, sodium ethoxide, and the corresponding potassium and lithium compounds are substituted for the potassium t-butoxide of this example on a mol for mol basis, substantially equivalent results are obtained.

Similarly when hexane, benzene, petroleum ether, ether, diphenyl ether, tetrahydrofuran, butyl amine, pyridine, and N,N-dimethyl formamide are substituted for the dimethyl sulfoxide solvent in this example, substantially equivalent results are obtained.

Also, when hexyl chloride, methyl iodide, and tetradecyl bromide are substituted in equimolar proportions for the dodecyl bromide in this example the corresponding 1,1-bis(methylsulfinyl) heptane, 1,1-bis(methylsulfinyl) ethane, and 1,1-bis(methylsulfinyl) pentadecane are formed.

Similarly when bis-(ethylsulfinyl) methane, 1,1-bis-(propylsulfinyl) tetradecane, 1,1-bis(methylsulfinyl) hexane, and 1,1-bis(methylsulfinyl) 3-dodecoxy propane are substituted for the bis(methylsulfinyl) methane in this example, the corresponding carbanions are formed which will undergo the same alkylation reaction with the aforementioned alkyl halides to form n,n-bis(alkylsulfinyl) alkanes wherein $n$ is some integer from 2 to about 19.

The 1,1-bis(methylsulfinyl) alkanes where the alkane contains from 9 to 17 carbon atoms are useful as detergent materials, particularly when combined with about an equal amount or more of sodium tripolyphosphate to form an effective laundry detergent as more fully described in copending application of Jim S. Berry and Warren I. Lyness, Serial No. 237,715, filed November 14, 1962. The 1,1-bis(methylsulfinyl) alkanes with alkanes having a lesser number of carbon atoms are useful as intermediates in the preparation of surfactive active agents.

Those products prepared by the process of this invention which are liquid are useful as solvents. Those having one long hydrophobic group will normally have surface active properties. Those compounds which have a hydrogen atom attached to a saturated carbon atom adjacent to at least one of the sulfoxide groups and containing no other group more reactive with a base than said hydrogen atom are useful as intermediates in the preparation of a wide variety of compounds. Those compounds having sufficient bulk will have utility as plasticizers and/or textile softeners.

What is claimed is:

1. The process of forming an alkali metal salt of a bis-sulfinyl carbanion said salt having the formula

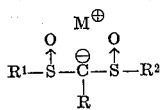

wherein M is an alkali metal and wherein R is selected from the group consisting of hydrogen and alkyl groups containing from one to about eighteen carbon atoms and $R^1$ and $R^2$ are each alkyl groups containing from one to about three carbon atoms comprising the step of reacting a bis-sulfoxide with the formula

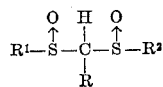

wherein R is selected from the group consisting of hydrogen and alkyl groups containing from one to about eighteen carbon atoms and $R^1$ and $R^2$ are each alkyl groups containing from one to about three carbon atoms, with a base selected from the group consisting of amides, hydrides, and alkoxides of alkali metals, said alkoxides containing from one to about six carbon atoms.

2. The compound

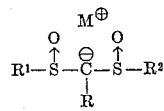

wherein M is an alkali metal and wherein R is selected from the group consisting of hydrogen and alkyl groups containing from one to about eighteen carbon atoms and $R^1$ and $R^2$ are each alkyl groups containing from one to about three carbon atoms.

3. The compound

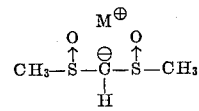

wherein M is an alkali metal.

4. The process of reacting the compound of claim 2 with an organic halide having the formula $$R^3-CH_2-X$$

wherein X is selected from the group consisting of chlorine, bromine, and iodine, and $R^3$ is selected from the group consisting of hydrogen and alkyl hydrocarbon chains containing from one to about thirty carbon atoms wherein the carbon of $R^3$ joining $R^3$ to the —$CH_2$—$X$ group is attached to the rest of the $R^3$ group by single covalent bond.

5. The process of preparing a detergent surfactant comprising the step of reacting the compound of claim 3 with an alkyl halide selected from the group consisting of chlorides, bromides, and iodides, said alkyl halide containing from about 8 to about 16 carbon atoms.

6. The process of reacting the compound of claim 2 with an alkyl halide selected from the group consisting of chlorides, bromides and iodides, said alkyl halide containing from about 8 to about 16 carbon atoms.

No references cited.

UNITED STATES PATENT OFFICE
CERTIFICATE OF CORRECTION

Patent No. 3,124,618                                  March 10, 1964

Jim Smither Berry

It is hereby certified that error appears in the above numbered patent requiring correction and that the said Letters Patent should read as corrected below.

In the grant (only), line 1, for "Jim Smither, of Berry, Springfield Township," read -- Jim Smither Berry, of Springfield Township, --; column 1, lines 29 and 30, for "sulfoxide" read -- sulfoxides --; line 31, for "sulfiide" read -- sulfide --; column 2, line 12, after "sodium" insert a comma; column 6, line 54, for "bond" read -- bonds --.

Signed and sealed this 14th day of July 1964.

(SEAL)

Attest:

ESTON G. JOHNSON                               EDWARD J. BRENNER
Attesting Officer                                   Commissioner of Patents